United States Patent [19]

Morie et al.

[11] 4,022,740
[45] May 10, 1977

[54] WATER AND GLYCOL BONDING DISPERSIONS FOR SYNTHETIC FIBERS

[75] Inventors: Gerald P. Morie; Cephas H. Sloan, both of Kingsport, Tenn.

[73] Assignee: Eastman Kodak Company, Rochester, N.Y.

[22] Filed: Apr. 30, 1975

[21] Appl. No.: 573,228

Related U.S. Application Data

[63] Continuation-in-part of Ser. No. 498,349, Aug. 19, 1974, abandoned, which is a continuation-in-part of Ser. No. 411,117, Oct. 30, 1973, abandoned.

[52] U.S. Cl. .................. 260/29.2 E; 131/10 R; 428/480; 428/481
[51] Int. Cl.$^2$ .................................. C08G 51/24
[58] Field of Search .................. 260/29.2 E, 33.4 R, 260/75 R, 75 T

[56] References Cited

UNITED STATES PATENTS

| | | | |
|---|---|---|---|
| 3,660,329 | 5/1972 | Wysocki | 260/22 |
| 3,712,873 | 1/1973 | Zenk | 260/29.2 E |
| 3,734,874 | 5/1973 | Kibler et al. | 260/29.2 E |
| 3,779,993 | 12/1973 | Kibler et al. | 260/75 S |
| 3,795,650 | 3/1974 | Burns | 260/33.4 R |

*Primary Examiner*—Theodore E. Pertilla
*Attorney, Agent, or Firm*—D. B. Reece, III; Malcolm G. Dunn

[57] ABSTRACT

Water and glycol bonding dispersion comprising water, high boiling glycols selected from 1,2-propanediol, 1,3-propanediol, 1,4-butanediol, 1,2-butanediol and 1,3-butanediol; and water and glycol dispersible polyester polymers. The polymer is present in the amount of about 5 to 40% by weight of the dispersion and preferably about 15 to 35% by weight, and is selected from polyesters of combinations of isophthalic acid and the sodium, potassium, or lithium salt of sulfoisophthalic acid reacted with diethylene glycol or triethylene glycol; and from terephthalic acid and the sodium, potassium or lithium salt of sulfoisophthalic acid reacted with diethylene glycol or triethylene glycol. The water and selected glycol(s) serve as a carrier or dispersion medium for the selected water and glycol dispersible polymer. The dispersions contain from about 0.1–20% water by weight. Also disclosed are tobacco smoke filter rods of cellulose acetate fibers, poly(hexamethylene adipamide) fibers and of poly(ethylene terephthalate) fibers bonded with the bonding dispersion.

8 Claims, No Drawings

4,022,740

WATER AND GLYCOL BONDING DISPERSIONS FOR SYNTHETIC FIBERS

BACKGROUND OF THE INVENTION

This invention is directed to an improved dispersion for bonding together man-made fibers such as crimped textile tows to be formed into nonwoven articles, such as tobacco smoke filter rods, which rods, after use as filter elements on cigarrets, will disintegrate into individual fibers upon prolonged contact with water or moisture in the environment; and to tobacco smoke filter rods of man-made fibers bonded with such improved dispersion.

Tobacco smoke filter rods made from cellulose acetate fibers are well-known and have been described in a number of patents. U.S. Pat. Nos. 2,794,239 and 3,017,309 are but two such patents from the many which described filters of this type.

The use of bonding plasticizers to obtain more rigid tobacco smoke filter rods for this purpose, for example, of eliminating the collapse of the filter rod when it becomes moist during smoking is also well-known. For instance, U.S. Pat. Nos. 3,003,504, 3,008,474 and 3,229,699 disclose plasticizers for such purpose.

Bonding plasticizers of the prior art may be prepared from esters of glycerin or esters of triethylene glycol. Such plasticizers are externally applied in relatively small quantities to a mass of individual filaments. The surface of the filaments, wherever plasticizer is present, quickly becomes soft and "sticky" due to the mild solvent action of the plasticizer. At the points where individual filaments touch each other, the softened surfaces merge together in a homogeneous mass. This phenomenon occurs in the first few minutes after the plasticizer has been applied. As time passes, the plasticizer migrates deeper into the filaments, the surface concentration becomes less and less, and the surface begins to harden or "cure." The surface is no longer soft and tacky, but has returned essentially to its original consistency. At those places where filaments contact each other, a strong, solid "weld" has taken place. These welded intersections hold each filament firmly in position relative to adjacent filaments, and an overall rigid structure results. The more rigid internal structure results in the filter rods produced from the tow, and facilitates further processing of the rods into tips or filter elements for attachement to cigarettes.

Cellulose acetate fibers bonded with plasticizers of the prior art such as triacetate of glycerol have a disadvantage from the standpoint of subsequent disposal after use in that the bond is permanent. Filters prepared with this plasticizer and a number of other bonding plasticizers remain firmly bonded together even after being buried in the ground for 1 year and exposed to about 40 inches of rainfall.

Filter cigarette butts are discarded in public places where they are unsightly. They are also discarded in public and private sewage systems where they may block screens and/or pipes in the systems. These two problems may be alleviated if not overcome when the fibers in the filters are not bonded permanently together.

SUMMARY OF THE INVENTION

The invention, therefore, is directed to non-tacky bonding dispersions effective for bonding together synthetic or man-made fibers, such as, for instance, fibers of cellulose acetate, poly(hexamethylene adipamide) or polyesters used for nonwoven articles, such as tobacco smoke filter rods. Filter elements, when served from the filter rods so bonded and subsequently attached to tobacco columns or cigarettes, disperse into individual fibers when the filter elements come into contact with water from the ground, rain, or a sewage treatment system. Such bonding dispersions are comprised of water and glycol dispersible polymers mixed in certain glycols containing small amounts of water.

More specifically, the bonding dispersion comprises water; high boiling glycols selected from 1,2-propanediol, 1,3-propanediol, 1,4-butanediol, 1,2-butanediol, and 1,3-butanediol; and polymers selected from polyesters which are dispersible in aqueous solutions of glycols. The concentration of the water and glycol dispersible polymer in the high boiling glycols may range from about 5% to about 40% by weight of the dispersion, and preferably in the amount of 15% to about 35% by weight of the dispersion. The dispersions contain from about 0.1–20.0% water by weight.

The amount of bonding dispersion may range from about 5% to 25% by weight on the fiber. The percentage of dispersion which is needed to achieve a good bond is dependent on the copolyester concentration in the dispersion. The amount of copolyester on the fiber must be at least 1% by weight, and may go up to about 3%. Depending upon the amount of copolyester used, the amount of glycol can vary from about 40 to about 94.9% by weight. In the situation where the amount of copolyester used is present in the dispersion in the amount of about 25% by weight, the preferred amount of glycol is present in the amount of about 68–73% by weight of the dispersion.

Polyester polymers which are useful for this purpose include combinations of isophthalic acid and the sodium, potassium or lithium salt of sulfoisophthalic acid reacted with diethylene glycol or triethyelen glycol. Others are prepared from terphthalic acid and the sodium, potassium or lithium salt of sulfoisophthalic acid reacted with diethylene glycol or triethylene glycol.

Preferred polyesters are those containing 5 to 15 mole percent of the sodium salt of sulfoisophthalic acid, 95 to 85 mole percent isophthalic acid and 100 mole percent diethylene glycol.

U.S. Pat. No. 3,734,874 to Kibler et al describes the preparation of the polyester polymers useful in this invention. These polymers are dispersible in glycols containing about 0.1–20% water. However, only the liquid low molecular weight glycols, 1,2-propanediol, 1,3-propanediol, 1,4-butanediol, 1,2-butanediol, or 1,3-butanediol, were found to be useful in preparing the bonding blends. The higher molecular weight polyols (150–20,000 mol. wt.) such as the poly(alkene ethers) shown in the Kibler et al patent formed highly viscous mixtures which were not suitable for application to and bonding of the filamentary tows. (See Table 1.)

It will thus be noted that the bonding formulations are true collodial dispersions and are not solutions.

DESCRIPTION OF THE PREFERRED EMBODIMENT

The object of the invention, as indicated above, is to provide certain compositions of thermoplastic polymers dispersed in certain glycols containing about 0.1% to about 20% water for bonding synthetic fibers together.

When a cellulose acetate tow, for instance, is treated with a copolyester-propylene glycol-water blend, a firm non-tacky tobacco smoke filter rod is formed in a few minutes. We believe that the explanation for the bonding mechanism is the following:

The liquid glycol and a small amount of water in the bonding dispersion function as a carrier or dispersion medium for the polymeric adhesive. After the blend is applied to the fibers and the filter rod is formed, the water evaporates and the liquid glycol migrates into the fibers leaving the polymeric adhesive on their surfaces to form bonds at various contact points throughout the filter rod.

It was proven by a two-step extraction of bonded filter rods that the polymeric adhesive and liquid glycol had separated. The water, of course, had previously evaporated. The liquid glycol in the bonded rod was extracted with diethyl ether leaving the polymeric adhesive on the fibers.

After the ether extraction, the rod remained firmly bonded. Then the polymeric adhesive, which is insoluble in ether, was extracted with water. After this extraction the rod was no longer bonded. Tobacco smoke filter rods bonded with these dispersions will disintegrate in a few minutes in water, or in a few days in moist soil. The fibers separate from their points of bond and the filters no longer retain their original shape. The separted fibers become mixed with organic fibrous materials on the ground where they add to the biological mulch. In other words, the bond between filaments is the dispersion employed and not, as in the prior art, the material of the fibers. More specifically, the bond is formed by the selected water and glycol dispersible polymer, and the water and glycol are not part of the bond. The liquid glycol is important in the formulation only because it prevents tackiness and premature adhesive action of the formulation, which would otherwise coat the surfaces of the filter rod-making equipment or other non-woven article processing equipment. This would cause the fibers to adhere to the filter rod-making equipment, resulting in severe filter rod-forming problems.

The glycol-polyester dispersions are prepared by first dispersing the polyester in water. The glycol is then added and the water is distilled from the blend under high vacuum to the desired composition. A typical laboratory preparation is as follows: Thirty grams of a polymer composed of 10 mole percent sodiosulfoisophthalic acid, 90 mole percent isophthalic acid and 100 mole percent diethylene glycol was dispersed in 70 grams of water. To this dispersion was added 92 grams of 1,2-propanediol. The mixture was transferred to a 250 ml. round-bottom distillation flask and connected to a rotary evaporator. About 28 inches of vacuum was applied and 61.5 grams of water were removed. (The flask was warmed with steam during the distillation.) The dispersion prepared by this method contained 23% polyester, 6.5% water and 70.5%, 1,2-propanediol. Other bonding dispersions can be prepared by this technique containing more or less amounts of water, other of the glycols can be substituted for 1,2-propanediol, and other of the polyesters can be used in the blend.

Table No. 1

Bonding Performance of Dispersions of Glycol-Water-Polyester

| Bonding Formulations | % Applied To Tow** | Viscosity of Blend, Centipoise | *Firmness of Bonded Rod | Bonding Rating |
|---|---|---|---|---|
| 73% 1,2-Propanediol 22% Polyester 5% H$_2$O | 10 | 105 | 8.4 | 1 |
| 73% 1,2-Butanediol 21% Polyester 6% H$_2$O | 10 | 70 | 9.8 | 1 |
| 72% Diethylene glycol 22% Polyester 6% H$_2$O | 10 | 208 | 20.8 | 3 |
| 72% Triethyleneglycol 20% Polyester 8% H$_2$O | 10 | 940 | 21.3 | 3 |
| 73% Tetraethyleneglycol 22% Polyester 5% H$_2$O | 10 | 1050 | 23.5 | 4 |
| 72% Poly(ethylene glycol) (Mol. Wt. - 600) 22% Polyester 6% H$_2$O | 10 | 2720 | 26.7 | 4 |

Bonding Rating - 1 = Good, 2 = Fair, 3 = Poor, 4 = No bond
Hardness Rating - <10 = acceptable hardness, >10 = not acceptable hardness
*Deflection in 0.1 mm. of a probe, 1.2 cm. in diameter, with a 400 g. load.
**3 denier/filament tow, 40,000 total denier polyester tow-poly(ethylene terephthalate).

These polymers may be applied to man-made fibers as dispersions in the aqueous glycol mixtures in the form of a spray, or by means of centrifugal force from a rotating brush or drum, or by immersion and suitable removal of any excess dispersion.

The application may be made to filamentary tows, such as crimped filamentary tows prior to conversion, for instance, into tobacco smoke filter rods. The crimped tow is thereafter pulled into a filter making machine and converted into such filter rods. The dispersion may be applied to unbloomed, crimped, crystalline tow such as polyester and packaged into bales or boxes. Later, the tow can be removed, bloomed and converted to filter rods in filter making device equipped with a heated garniture.

When the disclosed dispersions are applied to non-crystalline fibers such as cellulose acetate, the glycol diffuses into the fiber at ambient temperature and bonding occurs. Heat may be applied to accelerate the action.

Crystalline fibers, such as of polyester, need to be heated to achieve bonding.

The bonding dispersions disclosed may be used to bond man-made or synthetic fibers together at their points of contact with each other without the occurrence of a solvent action taking place between adjacent fibers and the subsequent hardening of the partially dissolved materials to form bonds between contacting fibers.

The following examples are used to illustrate the invention, but not to limit the scope of the invention.

EXAMPLE 1

A tow consisting of cellulose acetate fibers of 39,600 total denier (3.3 den./fil.) and crimped to 12 crimps/in. was sprayed with a mixture consisting of 70% propylene glycol, 5% water, and 25% of a copolyester composed of 90 mole percent isophthalic acid, 10% sodiosulfoisophthalic acid and 100 mole percent diethylene glycol. The tow, which contained 10% of the bonding formulation, was immediately converted to filter rods in a filter rod-making machine.

The rods became firm in approximately 30 minutes after which they were cut to 20-mm. lengths and attached to cigarettes. The filter cigarettes were smoked on an automatic smoking machine, and the removal of the total particulate matter (TPM) and nicotine from the smoke was determined. The filters had a resistance to draw of 2.6 in. of water, and they removed 36% of the TPM and nicotine. (Control filters containing glycerol triacetate removed 37% and 35% of the TPM and nicotine, respectively.) The filters remained bonded together during smoking. After the smoking test, one of the filters was placed in a 100 ml. beaker containing 50 ml. of water. The mixture was stirred at a medium rate. After 5 minutes, the filter separated into individual filaments and after 10 minutes was not recognizable as a filter Filters prepared from the same 3.3 den./fil. tow bonded with glycerol triacetate retained their original shape after being agitated in water for a period of 24 hours whereupon the test was terminated.

The bonding mechanism is explained as follows: Ten cellulose acetate filter rods, weighing 10 grams, containing 10 by weight of the bonding formulation, were placed in a Soxhlet extractor and extracted with 100 ml. of diethyl ether for 1 hour. The ether extract was then evaportated leaving a residue, identified by infrared spectroscopy as propylene glycol. The weight of the extract was 0.63 grams. The theoretical amount on the 10 plugs was 0.70 grams. Recovery = (0.63/0.70) × 100 = 90%.

After extraction of the propylene glycol from the rods, they still remained firmly bonded, indicating the polymeric adhesive was still on the fibers. The rods were then extracted with 100 ml. water for 2 hours. The water was then evaporated leaving the polymeric adhesive, which was identified by infrared spectroscopy. The weight of the polymeric adhesive recovered was 0.23 grams. The theoretical amount on the filters was 0.25 grams. Recovery of polymeric adhesive = (0.22/0.25) × 100 = 88%.

After the polymeric adhesive was extracted with water, the rods became limp and the fibers separated.

EXAMPLE 2

The effect of water concentrations on bonding performance and processability of the bonding formulation is determined as follows:

Bonding formulations are prepared by varying the water and glycol content and keeping the copolyester content constant. The formulations composed of water, 1,2-propanediol and a copolyester composed of 90 mole percent isophthalic acid, 10% sodiosulfoisophthalic acid and 100 mole percent diethyelene glycol are used to make filter rods from a cellulose acetate tow on regular filter-rod manufacturing equipment. (The cellulose acetate tow is of the same specification as described in Example 1.) The results of the bonding and processing tests are shown in the following table.

Table No. 2

| | Bonding Formulation | | | |
|---|---|---|---|---|
| % Water | % 1,2-Propanediol | % Copolyester | Amount Applied. % | Results |
| 0.1 | 74.9 | 25 | 10 | B |
| 1 | 74 | 25 | 10 | B |
| 5 | 70 | 25 | 10 | A |
| 10 | 65 | 25 | 10 | A |
| 15 | 60 | 25 | 10 | A |
| 20 | 55 | 25 | 10 | B |
| 25 | 50 | 25 | 10 | C |

A = Good bonding and processing
B = Fair bonding and processing
C = Poor bonding and processing

EXAMPLE 3

Example 1 was repeated with a tow consisting of poly(ethylene terephthalate) fibers of 40,000 total denier (4.0 den./fil.). The tow, which contained 10% of the bonding formulation described in Example 1, was nontacky and was placed in a container for 24 hours. It was non-takcy when it was removed from the container, and it was converted to filter rods in a heated filter rod-making device at 100° C. for 5 minutes. The rods became firm immediately and were cut to 20 mm lengths and attached to cigarettes. When tested as described in Example 1, the efficiency of the filters for TPM and nicotine was comparable to those shown in the example.

EXAMPLE 4

Example 3 was repeated with a tow consisting of poly(hexamethylene adipamide) fibers of 50,000 total denier (5.0 den./fil.). The fibers were nontacky at ambient temperature, but they bonded immediately when the tow was drawn through a heated filter-making device at 100° C. for 5 minutes.

Example 5

Example 1 was repeated except the bonding formulation was comprised of 71% 1,4-butanediol, 21% copolyester and 8% water. The filter's pressure drop, firmness and filter efficiency are equal to those filters described in Example 1.

EXAMPLE 6

A tow consisting of polyester (polyethylene terephthalate) fibers of 48,000 total denier (1.6 den./fil.) and containing 12 crimps/inch was sprayed with a mixture consisting of 70% propylene glycol, 5% water and 25% of a copolyester composed of 90 mole percent isophthalic acid, 10% sodiosulfoisophthalic acid and 100 mole percent diethylene glycol. The tow, which contained 10% of the bonding formulation, was converted to filter rods in a filter rod-making machine. The rods were heated 5 minutes in an oven at 100° C. to make them firm, and were cut to 20 mm. lengths and attached to cigarettes. The filter cigarettes were smoked on an automatic smoking machine and the removal of total particulate matter was determined. The filters had a draw resistance of 3.7 inches of water and removed 47% of the TPM and 51% of the nicotine. (Control filters of cellulose acetate bonded with glyceryl triacetate removed 48% of the TPM and 47% of the nicotine from cigarette smoke.) The filters remained bonded during smoking. After the smoking test, one of the filters was placed in a 100 ml. beaker containg 50 ml. of water. The water was stirred at a medium rate, and after 5 minutes, the filter separated into individual filaments. After 5 minutes more the filter was not recognizable as a filter.

The control filters composed of cellulose acetate and bonded with glyceryl triacetate retained their original shape after being agitated in water for a period of 24 hours whereupon the test was terminated.

EXAMPLE 7

Example 6 was repeated except the following technique was used to rapidly bond the polyester tow into a coherent filter rod. The tow was sprayed with 10% of the bonding formulation described in Example 6 as it entered the garniture of the plugmaker. Within the garniture, steam was forced through the tow at a rate of 20 ml./sec. The steam caused the rods to harden sufficiently for immediate use as cigarette filters. The pressure drop and removal efficiency of the filters were equal to those filters described in Example 6.

EXAMPLE 8

Example 1 is repeated except the bonding formulation is composed of 60%, 1,2-propanediol, 30% copolyester and 10% water. The filter's pressure drop, firmness and filter efficiency are equal to those filters described in Example 1.

EXAMPLE 9

Example 1 is repeated except the bonding formulation is composed of 10% water, 65% 1,3-propanediol, 25% copolyester composed of 90 mole percent terephthalic acid, 10 mole percent potassiosulfoisophthalic acid reacted with 100 mole percent diethylene glycol. The pressure drop firmness and filter efficiency are equal to those for the filters described in Example 1.

EXAMPLE 10

Example 1 is repeated except the lithium salt is substituted for the sodium salt of sulfoisophthalic acid in the copolyester. Filters prepared from the bonding formulation are equal in pressure drop, firmess and efficiency to those for the filters described in Example 1.

EXAMPLE 11

To illustrate the effect of the copolyester and glycol concentrations in the bonding blend a series of compositions are prepared and sprayed on tow. The poly(ether terephthlate) tow is converted to filter rods and allowed to cure for 2 hours. The composition of the bonding formulations, the amount applied to the tow and firmness of the bonded rods are shown in Table 3.

Table No. 3

| Bonding Formulation | | | | | Bonding Rating |
|---|---|---|---|---|---|
| % Copolyester[1] | % 1,2-Propanediol | % Water | % Applied | Firmness Of Rod[2] | |
| 5.0 | 94.9 | 0.1 | 22 | 10 | 2 |
| 5 | 85 | 10 | 25 | 10 | 2 |
| 10 | 82 | 8 | 20 | 10 | 2 |
| 15 | 79 | 6 | 15 | 10 | 1 |
| 20 | 73 | 7 | 10 | 9 | 1 |
| 25 | 68 | 7 | 8 | 9 | 1 |
| 30 | 64 | 6 | 5 | 9 | 1 |
| 35 | 55 | 10 | 5 | 9 | 1 |
| 40 | 52 | 8 | 5 | 9 | 1 |
| 35 | 45 | 20 | 13 | 9 | 1 |
| 40 | 40 | 20 | 5 | 9 | 1 |

[1]Copolyester composed of 90 mole percent isophthalic acid, 10 mole percent sodiosulfoisophthalic acid and 100 mole percent diethylene glycol.
[2]Firmness Rating <10 = acceptable hardness, >10 = not acceptable hardness (method described in Table 1).
[3]Bonding rating 1 = Good, 2 = Fair, 3 = Poor, 4 = No bond.

Although the examples relate to bonding synthetic or man-made materials such as cellulose acetate, polyester and polyamides, other suitable materials that are compatible with the compositions disclosed may also be bonded.

The discussion has been directed primarily to tobacco smoke filter rods, however, it should be understood that the invention is applicable to other nonwoven articles where it may be desirable to obtain separation of the fiber bonds after the articles have served their designated purposes.

Although the invention has been described in considerable detail with particular reference to certain preferred embodiments thereof, variations and modifications can be effected within the spirit and scope of the invention.

We claim:
1. A water and glycol bonding dispersion, the bonding dispersion being non-tacky and being effective for forming a bond between fibers with the bond being dispersible by water, the bonding dispersion comprising water present in the amount of about 0.1–20% by weight and at least one high boiling glycol present in the amount of about 40–94.9% by weight selected from 1,2-propanediol, 1,3-propanediol, 1,4-butanediol, 1,2-butanediol, and 1,3-butanediol; and water and glycol dispersible polymers present in the amount of about 5–40% by weight selected from polyesters of combinations of isophthalic acid, and the sodium, potassium, or lithium salt of sulfoisophthalic acid reacted with diethylene glycol or triethylene glycol; from terephthalic acid and the sodium, potassium or lithium salt of sulfoisophthalic acid reacted with diethylene glycol or triethyleneglycol.

2. Bonding dispersion of claim 1 wherein said polymer is present in an amount of 15–35% by weight.

3. Bonding dispersion of claim 1 wherein said dispersion contains about 5% water by weight.

4. Bonding dispersion of claim 1 wherein said polymer is a copolyester containing about 5 to 15 mole percent of the sodium, potassium or lithium salt of sulfoisophthalic acid, 95 to 85 mole percent isophthalic acid and 100 mole percent diethylene glycol.

5. Bonding dispersion of claim 1 wherein said is a copolyester containing about 10 mole percent of the sodium salt of sulfoisophthalic acid, 90 mole percent isophthalic acid and 100 mole percent diethylene glycol.

6. Bonding dispersion of claim 1 wherein said glycol is propylene glycol and said polymer is a copolyester composed of 90 mole percent isophthalic acid; 10 mole percent sodiosulfoisophthalic acid and 100 mole percent diethylene glycol.

7. Bonding dispersion of claim 1 wherein said polymer is present in the amount of about 25% by weight.

8. Bonding dispersion of claim 7 wherein said high boiling glycol is present in the amount of about 68–73% by weight of the dispersion.

* * * * *

UNITED STATES PATENT OFFICE
CERTIFICATE OF CORRECTION

Patent No. 4,022,740     Dated May 10, 1977

Inventor(s) Gerald P. Morie et al.

It is certified that error appears in the above-identified patent and that said Letters Patent are hereby corrected as shown below:

Column 8, in Table No. 3, after "Bonding Rating" the superscript -- 3 -- should be added.

Column 8, line 1, Claim 5, after "said" -- polymer -- should be inserted.

Column 10, line 1, Claim 7, "1" should read -- 6 --.

Signed and Sealed this

Twenty-second Day of November 1977

[SEAL]

Attest:

RUTH C. MASON
Attesting Officer

LUTRELLE F. PARKER
Acting Commissioner of Patents and Trademarks